United States Patent
Dai et al.

(10) Patent No.: US 7,961,143 B2
(45) Date of Patent: Jun. 14, 2011

(54) PARTIAL SEARCH CARRIER-PHASE INTEGER AMBIGUITY RESOLUTION

(75) Inventors: Liwen L. Dai, Chino Hills, CA (US); Daniel J. Eslinger, Huntington Beach, CA (US); Richard T. Sharpe, Torrence, CA (US); Ronald R. Hatch, Willington, CA (US)

(73) Assignee: Navcom Technology, Inc., Torrance, CA (US)

( * ) Notice: Subject to any disclaimer, the term of this patent is extended or adjusted under 35 U.S.C. 154(b) by 448 days.

(21) Appl. No.: 12/119,450

(22) Filed: May 12, 2008

(65) Prior Publication Data

US 2008/0297408 A1 Dec. 4, 2008

Related U.S. Application Data

(60) Provisional application No. 60/941,271, filed on May 31, 2007.

(51) Int. Cl.
G01S 19/44 (2010.01)
(52) U.S. Cl. .................................. 342/357.27
(58) Field of Classification Search .............. 342/357.27
See application file for complete search history.

(56) References Cited

U.S. PATENT DOCUMENTS

| | | | |
|---|---|---|---|
| 5,991,691 A | 11/1999 | Johnson | 701/214 |
| 6,127,968 A | 10/2000 | Lu | 342/357.03 |
| 6,753,810 B1 * | 6/2004 | Yang et al. | 342/357.27 |
| 7,312,747 B2 * | 12/2007 | Vollath et al. | 342/357.27 |
| 7,538,721 B2 * | 5/2009 | Vollath et al. | 342/357.27 |
| 2005/0001762 A1 | 1/2005 | Han et al. | |
| 2009/0262013 A1 | 10/2009 | Vollath | 342/357.04 |
| 2010/0253575 A1 * | 10/2010 | Vollath | 342/357.27 |

FOREIGN PATENT DOCUMENTS

EP 1498745 A2 1/2005

OTHER PUBLICATIONS

Dai, Liwen et al, "Innovative Algorithms to Improve Long Range RTK Reliability and Availability," ION Jan. 2007, pp. 860-872.*
Yang, Yunchun et al, "Minimizing the Integer Ambiguity Search Space for RTK," NavCom Technology White Paper Apr. 2005, pp. 1-7.*

(Continued)

Primary Examiner — Gregory C Issing
(74) Attorney, Agent, or Firm — Morgan, Lewis & Bockius LLP

(57) ABSTRACT

A method for performing integer ambiguity resolution in a global navigation satellite system is disclosed. A set of ambiguities, which are associated with carrier phase measurements of at least some of the signals received from the satellites in an identified set of satellites, are identified. Integer ambiguities are estimated and a best candidate set and a second best candidate set of integer ambiguity values are determined. Upon determining that the best set of integer ambiguity values fail to meet a discrimination test, each ambiguity for which integer ambiguity values in the best candidate set and second best candidate set fail to meet predefined criteria are removed from the set of ambiguities to produce a reduced set of ambiguities. The integer ambiguities in the reduced set of ambiguities are then resolved and an output is generated in accordance with the resolved integer ambiguities.

36 Claims, 8 Drawing Sheets

OTHER PUBLICATIONS

Yang, Yunchun et al, "A Fast Ambiguity Resolution Technique for RTK Embedded Within a GPS Receiver," NavCom White Paper, Oct. 2006, pp. 1-8.*

Park, Chansik et al, "Efficient Ambiguity Resolution Using Constraint Equation," IEEE Plans 1996, pp. 277-284.*

Chang, X.-W. et al., "MLAMBDA: A Modified LAMBDA Method for Integer Least-Squares Estimation," Journal of Geodesy, vol. 79, No. 9, Dec. 2005, pp. 552-565.

De Jonge, P. et al., "The LAMBDA Method for Integer Ambiguity Estimation: Implementation Aspects," Publications of the Delft Geodetic Computing Centre, No. 12, Aug. 1996, pp. 1-49.

Sivaraman, M.R. et al., "Applications of Kalman Filter in WAAS,"http://www.gisdevelopment.net/technology/gps/techgp0033pf.htm, May 12, 2002, pp. 1-6.

Dai, Liwen et al. Innovative Algorithms to Improve Long Range RTK Reliability and Availability. Proceedings of the 2007 National Technical Meeting of the Institute of Navigation. Jan. 24, 2007. pp. 860-872.

Mowlam, Adam. Baseline Precision Results Using Triple Frequency Partial Ambiguity Sets. Proceedings of the 17th International Technical Meeting of the Satellite Division of the Institute of Navigation GNSS, Sep. 24, 2004. pp. 2509-2518.

De Jonge, P.J. The Distributional Dependence of the Range on Triple Frequency GPS Amiguity Resolution. Proceedings of the 2000 National Technical Meeting of the Institute of Navigation. Jan. 28, 2000. pp. 605-612.

Teunissen, P.J.G. Geometry-free Ambiguity Success Rates in Case of Partial Fixing. Proceedings of the 1999 National Technical Meeting of the Institute of Navigation. Jan. 25, 1999. pp. 201-207.

International Search Report and Written Opinion, PCT/US2008/006608, Oct. 9, 2008, 9 pgs.

International Search Report and Written Opinion, PCT/US2008/006609, Oct. 9, 2008, 8 pgs.

Lawrence, *Decorrelation of Troposphere Across Short Baselines*, IEEE Plans 2006, pp. 94-102.

Office Action, U.S. Appl. No. 12/119,451, Sep. 30, 2010, 6 pgs.

* cited by examiner

PARTIAL SEARCH CARRIER-PHASE INTEGER AMBIGUITY RESOLUTION

RELATED APPLICATIONS

This application claims priority to U.S. Provisional Application No. 60/941,271, "Partial Search Carrier-Phase Integer Ambiguity Resolution," filed May 31, 2007, which is incorporated by reference in its entirety.

This application is related to U.S. patent application Ser. No. 12/119,451, filed May 12, 2008, "Distance Dependent Error Mitigation in Real-Time Kinematic (RTK) Positioning," which application is incorporated by reference herein in its entirety.

TECHNICAL FIELD

The disclosed embodiments relate generally to positioning systems, such as the Global Positioning System (GPS) or the European Galileo System, and more particularly to methods of resolving integer ambiguities in carrier-phase measurements made by mobile receivers in such positioning systems.

BACKGROUND

A wide-area positioning system, such as the Global Positioning System (GPS), uses a constellation of satellites to position or navigate objects on earth. Each satellite in the GPS system currently transmits two carrier signals, L1 and L2, with frequencies of 1.5754 GHz and 1.2276 GHz, and wavelengths of 0.1903 m and 0.2442 m, respectively. Next generation Global Navigation Satellite Systems (GNSS), such as the modernized GPS and Galileo systems, will offer a third carrier signal, L5. In the GPS system, L5 will have a frequency of 1.1765 GHz, and a wavelength of 0.2548 m.

Two types of GPS measurements are usually made by a GPS receiver: pseudorange measurements and carrier phase measurements.

The pseudorange measurement (or code measurement) is a basic GPS observable that all types of GPS receivers can make. It utilizes the C/A or P codes modulated onto the carrier signals. With the GPS measurements available, the range or distance between a GPS receiver and each of a plurality of satellites is calculated by multiplying a signal's travel time (from the satellite to the receiver) by the speed of light. These ranges are usually referred to as pseudoranges because the GPS measurements may include errors due to various error factors, such as satellite clock timing error, ephemeris error, ionospheric and tropospheric refraction effects, receiver tracking noise and multipath error, etc. To eliminate or reduce these errors, differential operations are used in many GPS applications. Differential GPS (DGPS) operations typically involve a base reference GPS receiver, a user GPS receiver, and a communication mechanism between the user and reference receivers. The reference receiver is placed at a known location and is used to generate corrections associated with some or all of the above error factors. Corrections generated at the reference station, raw data measured at the reference station, or corrections generated by a third party (e.g., a computer or server) based on information received from the reference station (and possibly other reference stations as well) are supplied to the user receiver, which then uses the corrections or raw data to appropriately correct its computed position.

The carrier phase measurement is obtained by integrating a reconstructed carrier of the signal as it arrives at the receiver. Because of an unknown number of whole cycles in transit between the satellite and the receiver when the receiver starts tracking the carrier phase of the signal, there is a whole-cycle ambiguity in the carrier phase measurement. This whole-cycle ambiguity must be resolved in order to achieve high accuracy in the carrier-phase measurement. Whole-cycle ambiguities are also known as "integer ambiguities" after they have been resolved, and as "floating ambiguities" or "real-valued ambiguities" prior to their resolution. The terms "ambiguity" and "ambiguities" refer to variables (i.e., variables representing whole cycle ambiguities) whose values are to be resolved, while the terms "ambiguity values," "integer ambiguity values" and "floating ambiguity values" refer to values that have been computed or determined for respective ambiguities. Differential operations using carrier-phase measurements are often referred to as real-time kinematic (RTK) positioning/navigation operations.

When GPS signals are continuously tracked and no loss-of-lock occurs, the integer ambiguities resolved at the beginning of a survey can be kept for the entire GPS kinematic positioning span. The GPS satellite signals, however, may be occasionally shaded (e.g., due to buildings in "urban canyon" environments), or momentarily blocked (e.g. when the receiver passes under a bridge or through a tunnel). Generally in such cases, the integer ambiguity values are "lost" and must be re-determined. This process can take from a few seconds to several minutes. In fact, the presence of significant multipath errors or unmodeled systematic biases in one or more measurements of either pseudorange or carrier phase may make it impossible with present commercial GPS RTK systems to resolve the ambiguities. As the receiver separation (i.e., the distance between a reference receiver and a mobile receiver whose position is being determined) increases, distance-dependent biases (e.g. orbit errors and ionospheric and tropospheric effects) grow, and, as a consequence, reliable ambiguity resolution (or re-initialization) becomes an even greater challenge.

SUMMARY OF EMBODIMENTS

A method for performing integer ambiguity resolution in a global navigation satellite system uses a partial search process, which takes advantage of information about the floating ambiguities to select those partial ambiguity combinations most likely to yield a successful search.

In one embodiment, initial floating ambiguities are estimated and then a best candidate set and a second best candidate set of integer ambiguity values are determined. Upon determining that the best set of integer ambiguity values fail to meet a discrimination test, each ambiguity for which integer ambiguity values in the best candidate set and second best candidate set fail to meet predefined criteria are removed from the set of ambiguities to produce a reduced set of ambiguities. The ambiguities in the reduced set of ambiguities are then resolved and an output is generated in accordance with the resolved integer ambiguities.

In another embodiment, a second reduced set of ambiguities is produced by removing each ambiguity for which integer ambiguity values in the best candidate set and second best candidate set fail to meet predefined criteria from the reduced set of ambiguities. The ambiguities in the second reduced set of ambiguities are then resolved and an output is generated in accordance with the resolved integer ambiguities.

This partial search process allows GPS RTK systems to resolve the ambiguities at faster rates, for longer-range applications, and in challenging environments. The process does not require substantial computation power, and thus, is suitable for GPS receivers with limited microprocessor capabilities.

BRIEF DESCRIPTION OF THE DRAWINGS

Like reference numerals refer to corresponding parts throughout the drawings.

DESCRIPTION OF EMBODIMENTS

Figure 1:
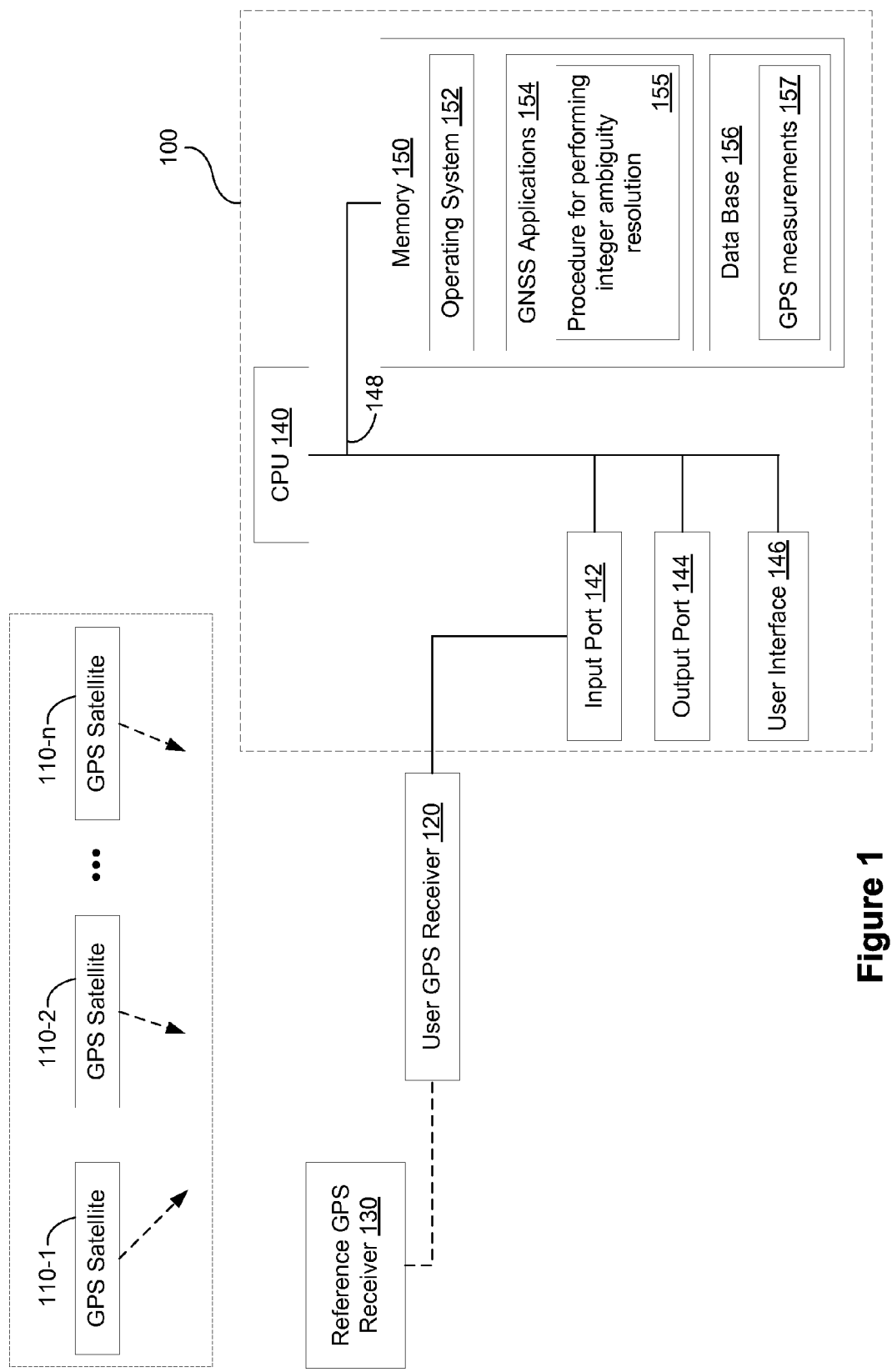
FIG. 1 is a block diagram of a computer system that can be used to carry out a method for performing partial search integer ambiguity resolution in a global navigation satellite system in accordance with some embodiments.

FIG. 1 illustrates a computer system 100 that can be used to carry out a method for performing partial search integer ambiguity resolution, according to one embodiment of the present invention. The computer system 100 is coupled to a user GPS receiver 120 which supplies to the computer system 100 GPS code and carrier-phase measurements based on signals from a plurality of satellites 110-1, 110-2, . . . , 110-n, where n is the number of satellites in view of the user GPS receiver 120. The plurality of satellites 110-n, or any one or more of them, are sometimes referred to hereafter in this document as satellites(s) 110. The user GPS receiver 120 may be in communication with a reference GPS receiver 130. The reference GPS receiver 130 is also taking measurements based on signals from the plurality of satellites 110. The measurements made by the reference GPS receiver 130 are used to generate corrections to the GPS measurements taken at the user GPS receiver 120. The user GPS receiver 120, or the combination of the user GPS receiver 120 and the computer system 100, is sometimes called the mobile receiver, in contrast to the reference GPS receiver, which is typically (but not necessarily) at a fixed position or location.

In some embodiments, the user GPS receiver 120 and the computer system 100 are integrated into a single device within a single housing, such as a portable, handheld, or even wearable position tracking device, or a vehicle-mounted or otherwise mobile positioning and/or navigation system. In other embodiments, the user GPS receiver 120 and the computer system 100 are not integrated into a single device.

As shown in FIG. 1, the computer system 100 includes one or more central processing units (CPUs) 140 (e.g., one or more microprocessors or microprocessor cores), memory 150, an input port 142 and an output port 144, and (optionally) a user interface 146, coupled to each other by one or more communication buses 148. Memory 150 may include high-speed random access memory and may include nonvolatile mass storage, such as one or more magnetic disk storage devices, optical disk storage devices, flash memory devices, or other non-volatile solid state storage devices. Memory 150 preferably stores an operating system 152, a database 156, and GPS application procedures 154. The GPS application procedures may include procedures 155 for implementing the method for performing partial search integer ambiguity resolution, according to one embodiment of the present invention, as described in more detail below. The operating system 152 and application programs and procedures 154 and 155 stored in memory 150 are for execution by the one or more CPUs 140 of the computer system 100. Memory 150 preferably also stores data structures used during execution of the GPS application procedures 154 and 155, including GPS pseudorange and/or carrier-phase measurements 157, as well as other data structures discussed in this document.

The input port 142 is for receiving data from the user GPS receiver 120, and output port 144 is used for outputting data and/or calculation results. Data and calculation results may also be shown on a display device of the user interface 146. While the description in this document frequently uses the terms "GPS" and "GPS signals" and the like, the present invention is equally applicable to other GNSS systems and the signals from the GNSS satellites in those systems.

Figure 2:
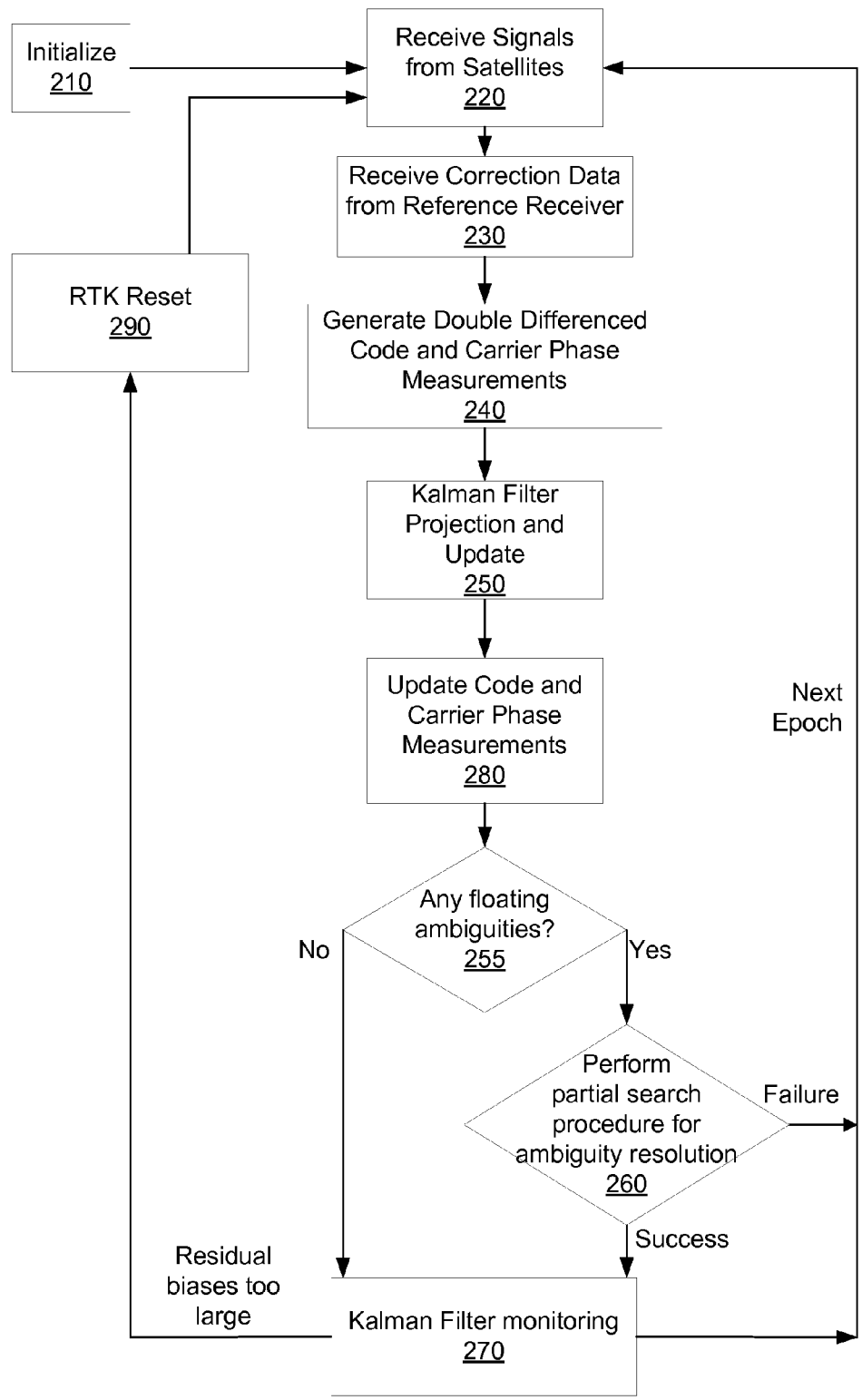
FIG. 2 is a flow diagram illustrating real-time kinematic positioning operations in accordance with some embodiments.

FIG. 2 illustrates the computational flow for real-time kinematic (RTK) positioning/navigation operations. The RTK operations are initialized 210 so that a set of Kalman filter states are cleared. Signals are received from the satellites 220 and correction data is received from the reference receiver 230.

While an explanation of Kalman filters is outside the scope of this document, the computer system 100 typically includes a Kalman filter for updating the position and other aspects of the state of the user GPS receiver 120, also called the Kalman filter state. The Kalman filter state actually includes many states, each of which represents an aspect of the GPS receiver's position (e.g., X, Y and Z, or latitude, longitude and zenith components of position), or motion (e.g., velocity and/or acceleration), or the state of the computational process that is being used in the Kalman filter.

The Kalman filter is typically a procedure, or set of procedures, executed by a processor. The Kalman filter is executed repeatedly (e.g., once per second), each time using new code measurements (also called pseudorange measurements) and carrier phase measurements, to update the Kalman filter state. While the equations used by Kalman filters are complex, Kalman filters are widely used in the field of navigation, and therefore only those aspects of the Kalman filters that are relevant to the present invention need to be discussed in any detail. It should be emphasized that while Kalman filters are widely used in GPS receivers and other navigation systems, many aspects of those Kalman filters will vary from one implementation to another. For instance, the Kalman filters used in some GPS receivers may include states that are not included in other Kalman filters, or may use somewhat different equations than those used in other Kalman filters.

An aspect of Kalman filters that is relevant to the present discussion is the inclusion of ambiguity values in the Kalman filter state, and the status of those values. During the process of attempting to lock onto the signals from a set of GPS (or GNSS) satellites, the ambiguity values for the carrier phase measurements from each satellite are called "floating ambiguity values." After lock has been achieved, the ambiguity values have been resolved, they are called integer ambiguity values, or fixed ambiguity values, because the resolved ambiguity values are fixed in value, and are integers. From another viewpoint, the Kalman filter procedures, or other procedures in the computer system 100, detect when the floating ambiguity values have stabilized, at which point the stabilized ambiguity values become integer ambiguity values.

Based on the signals from the satellites 220 and the correction data from the reference receiver 230, double differenced code and carrier phase measurements are then generated 240. In precise GPS positioning applications, double differenced carrier phase measurements are usually formed to cancel many of the systematic errors existing in the GPS measurements. The double differenced code and carrier phase observables in units of meters can be formed as:

$$\nabla \Delta P_i = \nabla \Delta \rho + \nabla \Delta T + \frac{\nabla \Delta I}{f_i^2} + \nabla \Delta O + \varepsilon_{\nabla \Delta P_i} \quad (1)$$

$$\lambda_i \nabla \Delta \phi_i = \nabla \Delta \rho + \nabla \Delta T - \frac{\nabla \Delta I}{f_i^2} + \nabla \Delta O + \lambda_i \cdot \nabla \Delta N_i + \varepsilon_{\nabla \Delta \phi_i} \quad (2)$$

where: the subscript i denotes the frequency, i.e., L1, L2 or L5; $P_i$ and $\phi_i$ are the code and carrier phase observables, respectively; $\nabla \Delta$ is the double difference operator; $\rho$ is the geometric distance from the satellite to the receiver; $\nabla \Delta T$ is the residual differential tropospheric bias, which is classically represented as a function of the residual zenith tropospheric delay together with a mapping function that describes the dependence of tropospheric delay on the elevation angle from the receiver to the satellite; $\nabla \Delta I$ is the double differential ionospheric bias; $\nabla \Delta O$ is the double differential orbital error correction that may be obtained from a network RTK system or a wide area augmentation system (WAAS), such as Navcom Technology Inc.'s StarFire™ Network; $\lambda_i$ and $f_i$ are the wavelength and frequency of the $i^{th}$ carrier frequency, respectively; $\nabla \Delta N_i$ is the double difference integer ambiguity for the $i^{th}$ carrier frequency; and the terms $\varepsilon_{\nabla \Delta P_i}$ and $\varepsilon_{\nabla \Delta \phi_i}$ represent the code and phase residual errors, respectively, including random noises of receivers and any unmodeled systematic errors, such as multipath, residual orbit errors, etc.

Linearization of the double differenced carrier phase observations can be represented by the following set of equations:

$$V_k = HZ - Z_k \quad (3)$$

where: $V_k$ is the post-fit residual vector at epoch k; $Z_k$ is the prefit residuals; H is the design matrix; and X is the estimated state vector including three position components, residual ionospheric and tropospheric biases, and dual or triple frequency ambiguities. The estimated state vector X may optionally include velocity and acceleration components as well. The values for X are stored in Kalman filter states.

As shown in FIG. 2, the RTK positioning/navigation operations continue with Kalman filter projections and state updates 250. If Kalman filter estimates after k−1 epochs are represented by $\hat{X}_{k-1}^+$ with variance $Q_{k-1}^+$, the predicted state vector at epoch k is given by:

$$X\hat{X}_k^- = \Phi_{k-1,k} \hat{X}_{k-1}^+ \quad (4)$$

$$Q_k^- = \Phi_{k-1,k} Q_{k-1}^+ \Phi_{k-1,k}^T + W_k \quad (5)$$

where: $\hat{X}_k^-$ is the predicted Kalman filter state vector at epoch k, based on the Kalman filter state from epoch k−1; $\Phi_{k,k-1}$ is the transition matrix, which relates $X_{k-1}$ to $X_k$; $W_k$ is the dynamic matrix whose elements are a white noise sequence; $Q_k^-$ is the variance-covariance matrix of the predicted state of the Kalman filter at epoch k; and $Q_{k-1}^+$ is the estimated variance-covariance matrix of the Kalman filter at epoch k−1.

For simplicity, in the following equations the subscript k, representing epoch k, will be omitted for $\hat{X}_k^-$ and $\hat{X}_k^+$. The updated state vector $\hat{X}^+$ for epoch k is generated using the measurement vector $Z_k$ by applying an observation equation:

$$\hat{X}^+ = \hat{X}^- + K Z_k \quad (6)$$

where K is a gain matrix, discussed below. $\hat{X}^+$ can be expressed in the following form (Equation (7) is for systems using dual frequency receivers and Equation (8) is for three frequency receivers):

$$\hat{X}^+ = \begin{pmatrix} \hat{X}_c \\ \hat{N}_{L1} \\ \hat{N}_{L2} \end{pmatrix} \quad (7)$$

$$\hat{X}^+ = \begin{pmatrix} \hat{X}_c \\ \hat{N}_{L1} \\ \hat{N}_{L2} \\ \hat{N}_{L5} \end{pmatrix} \quad (8)$$

The gain matrix is:

$$K = Q^- H^T (H Q^- H^T + R)^{-1} \quad (9)$$

where: R is the variance-covariance matrix of the observables (measurements); and $\hat{X}^-$ and $\hat{X}^+$ are the Kalman filter predicted state vector and estimated state vector, respectively, at the current epoch.

The variance-covariance $Q^+$ of the state vector $\hat{X}^+$ is given by:

$$Q^+ = (I - KH) Q^- \quad (10)$$

where: I is the identity matrix. $Q^+$ can be expressed in the following form (Equation (11) for dual frequency receivers and Equation (12) for three frequency receivers):

$$Q^+ = \begin{pmatrix} Q_{C,C} & Q_{C,N_{L1}} & Q_{C,N_{L2}} \\ Q_{N_{L1},C} & Q_{N_{L1},N_{L1}} & Q_{N_{L1},N_{L2}} \\ Q_{N_{L2},C} & Q_{N_{L2},N_{L1}} & Q_{N_{L2},N_{L2}} \end{pmatrix} \quad (11)$$

$$Q^+ = \begin{pmatrix} Q_{C,C} & Q_{C,N_{L1}} & Q_{C,N_{L2}} & Q_{C,N_{L5}} \\ Q_{N_{L1},C} & Q_{N_{L1},N_{L1}} & Q_{N_{L1},N_{L2}} & Q_{N_{L1},N_{L5}} \\ Q_{N_{L2},C} & Q_{N_{L2},N_{L1}} & Q_{N_{L2},N_{L2}} & Q_{N_{L2},N_{L5}} \\ Q_{N_{L5},C} & Q_{N_{L5},N_{L1}} & Q_{N_{L3},N_{L2}} & Q_{N_{L5},N_{L5}} \end{pmatrix} \quad (12)$$

To determine an "optimal solution," sometimes called a "fixed ambiguity solution," for the ambiguity values, a constraint is added to the state vector:

$$X_N = N_k \quad (13)$$

where $X_N$ represents the portion of the Kalman filter state that represents ambiguity values for the received satellite signals, and $N_k$ is an integer vector. The fixed results can then be obtained using the following equations:

$$\tilde{X}_{C,k} = \hat{X}_C - Q_{\hat{X}_C \hat{X}_N} Q_{\hat{X}_N}^{-1} (\hat{X}_N - N_k) \quad (14)$$

$$Q_{\tilde{X}_{C,k}} = Q_{\hat{X}_C} - Q_{\hat{X}_C \hat{X}_N} Q_{\hat{X}_N}^{-1} Q_{\hat{X}_N \hat{X}_C} \quad (15)$$

Equation (14) represents the final adjusted position coordinates after the floating ambiguity values are modified to the associated integer ambiguity values. Equation (15) represents the final variance-covariance of the position coordinates after the floating ambiguities are fixed to the associated integer values. The subscript "c" in Equations (14) and (15) denotes the portion of the Kalman state vector associated with the position coordinates, tropospheric and ionospheric states, and, where applicable, the velocity and acceleration states.

A process for obtaining or finding the fixed ambiguity solution includes solving the integer least squares equation:

$$(\hat{X}_N - N_k)^T Q_{\hat{X}_N}^{-1} (\hat{X}_N - N_k) = R_k = \min \quad (16)$$

For each different integer set $N_k$, a different value of $R_k$ will be obtained. A single value is obtained for each candidate set $N_k$ of integer ambiguities. An optimal integer set $N_k$ that satisfies Equation (16), by producing the smallest value of $R_k$, and that also satisfies a discrimination test, is accepted as the correct integer ambiguity set and is used to produce the final fixed ambiguity solution. The discrimination test is discussed below in relation to FIG. 3A.

As shown in FIG. 2, a test is performed at the conclusion of each iteration or epoch of the Kalman filter update process 250. If there are any floating ambiguities in the carrier phase measurements 255, a partial search procedure is performed for ambiguity resolution 260. In one embodiment, search techniques in the estimated ambiguity domain using least-squares or Kalman filter estimation may be used to resolve the whole-cycle carrier phase ambiguities. In one embodiment, search techniques in the estimated ambiguity domain can be implemented for the original ambiguity parameters. In another embodiment, the search techniques may be implemented using combinations of the original parameters.

In one embodiment, the Least-squares AMBiguity Decorrelation Adjustment (LAMBDA) method may be used to perform the search using transformed floating ambiguities (Teunissen, 1994). The transformed integer ambiguities are constructed from the original ambiguities, and can be used to recover the original integer ambiguities once the solution for the transformed integer ambiguities has been determined. The advantage of this procedure is that the transformed floating ambiguities have smaller standard deviations and there is a smaller number of integer candidate sets, and thus, the computation time is significantly reduced. The LAMBDA method involves a discrete search strategy to fix the integer ambiguities. It features two distinctive procedures for integer ambiguity estimation including ambiguity decorrelation (or Z-transformation) followed by a discrete search for the integer ambiguities (i.e., the actual integer ambiguity estimation). The key to the LAMBDA method is the computation of the transformation matrix for constructing multi-satellite ambiguity combinations.

In some embodiments, a modified LAMBDA (MLAMBDA) method for integer least-squares estimation is used. The MLAMBDA includes a modified Z matrix reduction process and modified search process (X. W Zhang, 2005). The ambiguity transformation matrix Z reformulates the original ambiguity vector as a transformed ambiguity vector, whose variance-covariance matrix has much smaller diagonal elements:

$$\hat{Z}_N = Z \cdot \hat{X}_N \quad (17)$$

$$Q_{\hat{Z}_N} = Z Q_{\hat{X}_N} Z^T \quad (18)$$

Therefore, Equation (16) can be re-written as:

$$R_k = (\hat{Z}_N - N_k^Z)^T Q_{\hat{Z}_N}^{-1} (\hat{Z}_N - N_k^Z) \quad (19)$$

For a different integer set $N_k^Z$, a different value of $R_k$ will be obtained. The original ambiguity estimation problem has therefore been changed. The new problem is to search for an integer set that makes and passes both validation and rejection criteria tests.

In order to ensure that the transformed ambiguity values have integer characteristics, the transformation matrix Z has only integer entries. In order to ensure that the original ambiguity values can be determined from the transformed ambiguity values, the inverse of the transformation matrix also has only integer entries. Therefore, the matrix Z is an admissible ambiguity transformation if and only if matrix Z has integer entries and its determinant equals 1. The original ambiguities are recovered via:

$$N_k = Z^{-1} \cdot N_k^Z \quad (20)$$

The LAMBDA or the MLAMBDA methods may be referred to hereinafter as simply the LAMBDA method.

When the integer ambiguity values produced by the LAMBDA method, or other computation method, fail to satisfy a discrimination test, a partial search procedure may be performed to remove one or more ambiguities from the set of ambiguities to be searched, reducing the amount of computation time necessary for integer ambiguity resolution. Conceptually, the partial search process removes from the set of ambiguities one or more outliers. Outliers may be associated with noisy or corrupted signals, or with signals from satellites that are close to the horizon. Removal of these outliers often enables the LAMBDA process (or other integer ambiguity determination process) to successfully determine, for the remaining ambiguities, integer ambiguity values that satisfy the discrimination test. In one embodiment, the partial search procedure eliminates one or more ambiguities from the integer set $N_k$. In another embodiment, measurements based on signals received from one or more satellites are eliminated from the search process. The partial search procedure is described in detail below.

If the ambiguity resolution process fails, the procedure can be repeated until the resolution is successful. If all possible sets of ambiguity values for five or more satellites have been tested and the ambiguity test still fails, the ambiguity resolution procedure in the present epoch has failed, the RTK solution is reset 290 and signals from the satellites are received 220 for the next epoch.

If the resolution is successful, however, the RTK positioning/navigation operations continue with monitoring of the Kalman filter 270 to determine if residual biases exceed a predefined threshold. Large residual biases could indicate that Kalman filter projections are incorrect and are negatively affecting the carrier phase measurements. If it is determined that the residual biases are too large (i.e., exceed a predefined threshold or fail to satisfy predefined criteria), the RTK solution is reset 290. If, however, it is determined that the residual biases are accurate enough, the code and carrier phase measurements are updated 280 and signals from the satellites are received 220 for the next epoch.

Figure 3A:
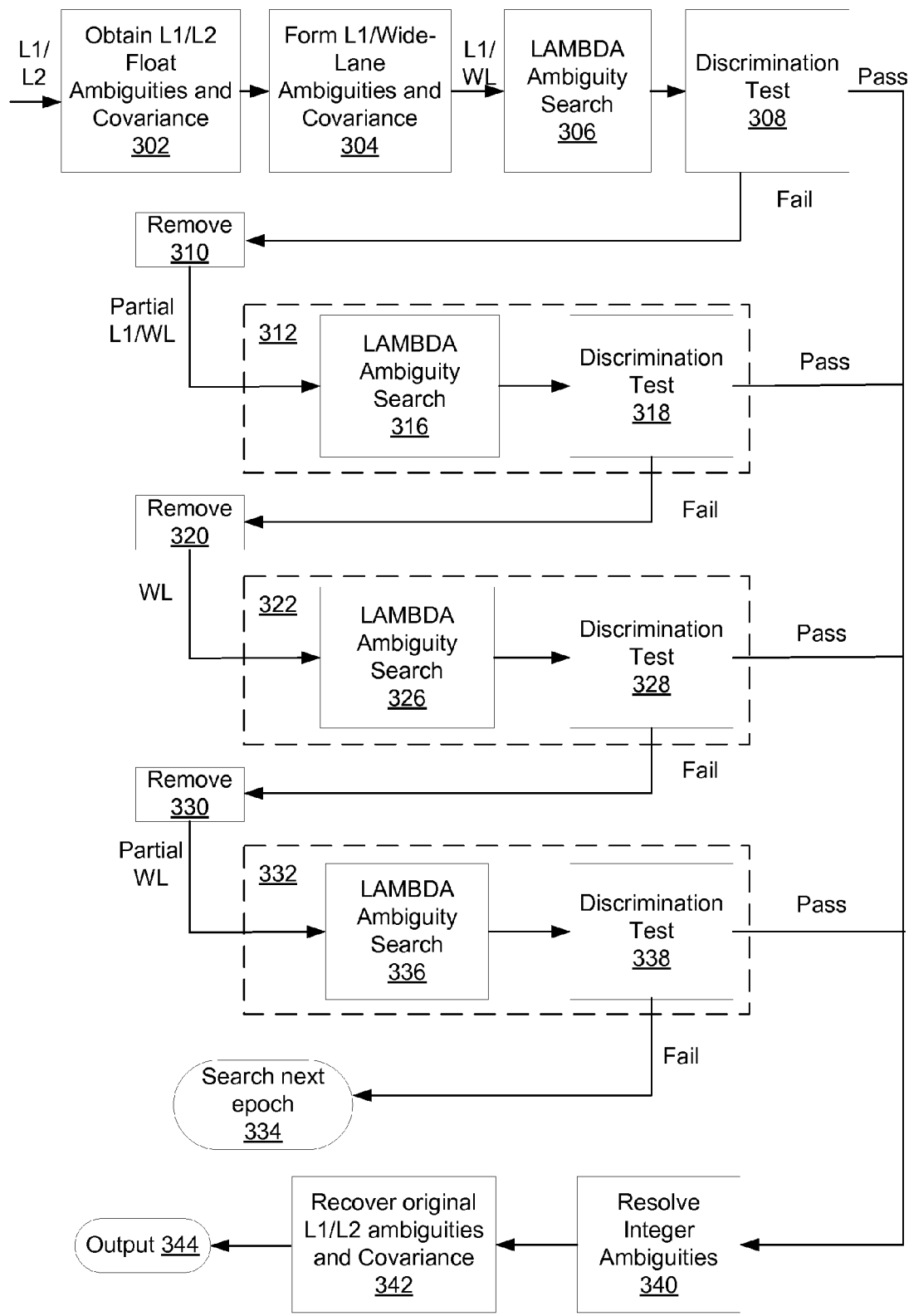
FIG. 3A is a flow diagram illustrating a partial search process for a dual frequency global navigation satellite system in accordance with some embodiments.

FIG. 3A illustrates the partial search computational flow for a dual frequency global navigation satellite system. After the double-difference measurements from both frequencies are processed 240 (FIG. 2), the floating ambiguity values vector and the associated variance matrix can be obtained 302 from Equations (5) and (7) from the Kalman filter estimation 250 (FIG. 2). Although the L1 and L2 floating ambiguities are the parameters estimated, the ambiguity pairs to be searched in the LAMBDA method may be different. In one embodiment, $\hat{N}_1$ and wide-lane $\hat{N}_{(1,-1)}$ ambiguities are chosen for the search process and are formed 304 from the original L1 and L2 float ambiguity vector of Equation (5) using the following equation:

$$\begin{pmatrix} \hat{N}_1 \\ \hat{N}_{(1,-1)} \end{pmatrix} = \begin{pmatrix} 1 & 0 \\ 1 & -1 \end{pmatrix} \begin{pmatrix} \hat{N}_1 \\ \hat{N}_2 \end{pmatrix} \quad (21)$$

Based on Equations (10) and (11), the variance-covariance matrix of ambiguity values $\hat{N}_1$ and $\hat{N}_{(1,-1)}$ is obtained as follows:

$$Q_{\hat{N}_1,\hat{N}_{(1,-1)}} = \begin{pmatrix} 1 & 0 \\ 1 & -1 \end{pmatrix} \begin{pmatrix} Q_{N_1} & Q_{N_1 N_2} \\ Q_{N_2 N_1} & Q_{N_2} \end{pmatrix} \begin{pmatrix} 1 & 1 \\ 0 & -1 \end{pmatrix} \quad (22)$$

The best candidate set and second best candidate set corresponding to the two smallest values of $R_k$ for $\hat{N}_1$ and $\hat{N}_{(1,-1)}$ can be found with the LAMBDA search process 306 as described above.

The discrimination test 308 includes a ratio test of the best candidate set and the second best candidate set. In particular, an empirical ratio value equal to 3 could be used for the discrimination test. The ratio test is used because the bigger the ratio, the greater chance that the best candidate set is correct. In one embodiment, an additional compatibility test is included in the discrimination test. The compatibility test is passed if the difference between the fixed ambiguity value and the floating ambiguity value is less than three to five times the float solution's standard deviation. If the discrimination test 308 is passed, the best candidate set is accepted as the correct set of integer ambiguity values, thereby resolving the set of ambiguities (which can also be called the set of ambiguity values) 340, the original L1/L2 or L1/L2/L5 signals are recovered 342 (as discussed below), and the resulting fixed solution is output 344 using Equations (14) and (15).

The partial search procedure is applied when the best candidate set and second best candidate set of $\hat{N}_1$ and $\hat{N}_{(1,-1)}$ fail to pass the discrimination test 308. In one embodiment, the partial search technique is to exclude, from the set of ambiguities whose values are being determined, those ambiguity values whose integer ambiguity values in the best candidate set and second best candidate set are different. In another embodiment, the partial search technique is to exclude those satellites whose ambiguities in the best candidate set and second best candidate set are not identical. This second approach, in effect, removes from the set of ambiguities all the ambiguities removed in the first approach, plus any sibling ambiguities for satellites which have at least one ambiguity value that is different in the best and second best candidate sets.

Once the set of ambiguities to be searched has been reduced by removal operation 310, a new search 312 is performed, including a LAMBDA search process 316 for best and second best candidate sets for the reduced set of ambiguities produced by operation 310, and a discrimination test 318 performed on the resulting best and second best integer ambiguity candidate sets. If the discrimination test 318 is passed by the new best candidate set, the procedure moves to operation 340, as described above.

Otherwise, if the discrimination test 318 fails, the procedure moves to remove operation 320 in which all of the $\hat{N}_1$ ambiguity values are removed from the set of ambiguities to be searched, while all of the wide-lane $\hat{N}_{(1,-1)}$ ambiguities are retained in the set of ambiguities (also called the set of ambiguity values) to be searched. Once the set of ambiguities to be searched has been reduced by removal operation 320, a new search 322 is performed, including a LAMBDA search process 326 for best and second best candidate sets for the reduced set of integer ambiguity values produced by operation 320, and a discrimination test 328 performed on the resulting best and second best integer ambiguity candidate sets. If the discrimination test 328 is passed by the new best candidate set, the procedure moves to operation 340, as described above.

Otherwise, if the discrimination test 328 fails, the procedure moves to remove operation 330 in which all the wide-lane $\hat{N}_{(1,-1)}$ ambiguities whose integer ambiguities of the best candidate set and second best candidate set (as generated by the LAMBDA search process 326) are different are removed from the set of ambiguities to be searched. As noted above, all the $\hat{N}_1$ ambiguities have already been removed from the set of ambiguities to be searched in remove operation 320. Using the remaining wide-lane $\hat{N}_{(1,-1)}$ ambiguities, a new search 322 is performed, including a LAMBDA search process 336 for best and second best integer ambiguity candidate sets for the reduced set of ambiguities produced by operation 330, and a discrimination test 338 performed on the resulting best and second best candidate sets. If the discrimination test 338 is passed by the new best candidate set, the procedure moves to operation 340, as described above. Otherwise, the search process fails for the current epoch and is the process begins anew at the next epoch 334, using new measurement values for the satellite signals.

The $\hat{N}_1$ and $\hat{N}_{(1,-1)}$ searches 312, 322, and 332 comprise finding the best integer ambiguity candidate set and second best integer ambiguity candidate set with the LAMBDA search process 316, 326, 336 and then applying the discrimination test 318, 328, 338. In one embodiment, during each epoch the partial search process is repeatedly applied until either (A) any of the remove processes 310, 320, 330 results in the search set having ambiguity values for fewer than five satellites, (B) failure of all the searches, or (C) the search is successful, as indicate by one of the best integer ambiguity candidate sets passing the corresponding discrimination test 318, 328 or 338.

If the discrimination test 308, 318, 328 or 338 is passed, the best candidate set that passes the discrimination test is accepted as the correct ambiguity set to resolve the integer ambiguities 340 and to produce the fixed solution 344 from Equations (14) and (15).

In some embodiments, once a best candidate set (which may comprise a partial set of integer ambiguity values $\hat{N}_1$ and $\hat{N}_{(1,-1)}$ because of the application of one or more remove operations 310, 320, 330) passes the discrimination test, the original L1 and L2 ambiguities states and the variance-covariance in the Kalman filter can be recovered 342 with the following equations:

$$\begin{pmatrix} \hat{N}_1 \\ \hat{N}_2 \end{pmatrix} = \begin{pmatrix} 1 & 0 \\ 1 & -1 \end{pmatrix} \begin{pmatrix} \hat{X}_{N_1} \\ \hat{X}_{N_{(1,-1)}} \end{pmatrix} \quad (23)$$

$$Q_{\hat{N}_1,\hat{N}_2} = \begin{pmatrix} 1 & 0 \\ 1 & -1 \end{pmatrix} \begin{pmatrix} Q_{N_1} & Q_{N_1 N_{(1,-1)}} \\ Q_{N_{(1,-1)} N_1} & Q_{N_{(1,-1)}} \end{pmatrix} \begin{pmatrix} 1 & 1 \\ 0 & -1 \end{pmatrix} \quad (24)$$

Note, if $\hat{N}_1$ is floating but $\hat{N}_{(1,-1)}$ is fixed, the fractional part of $\hat{N}_1$ and $\hat{N}_2$ is exactly the same, and the variance of $Q_{\hat{N}_1}$, $Q_{\hat{N}_2}$, and covariance $Q_{\hat{N}_1 \hat{N}_2}$ are the also the same. If $\hat{N}_1$ is fixed later, the fixed values of $\hat{N}_1$ and $\hat{N}_2$ will be adjusted to integer values and the variance and co-variance will become zero.

In one embodiment, if all possible integer ambiguity sets have been searched and the discrimination test still fails, the ambiguity resolution procedure in the present epoch has failed and the process of searching for a consistent set of ambiguity values that pass the discrimination test resumes in the next epoch 334, using new measurements of the satellite signals.

Figure 3B:
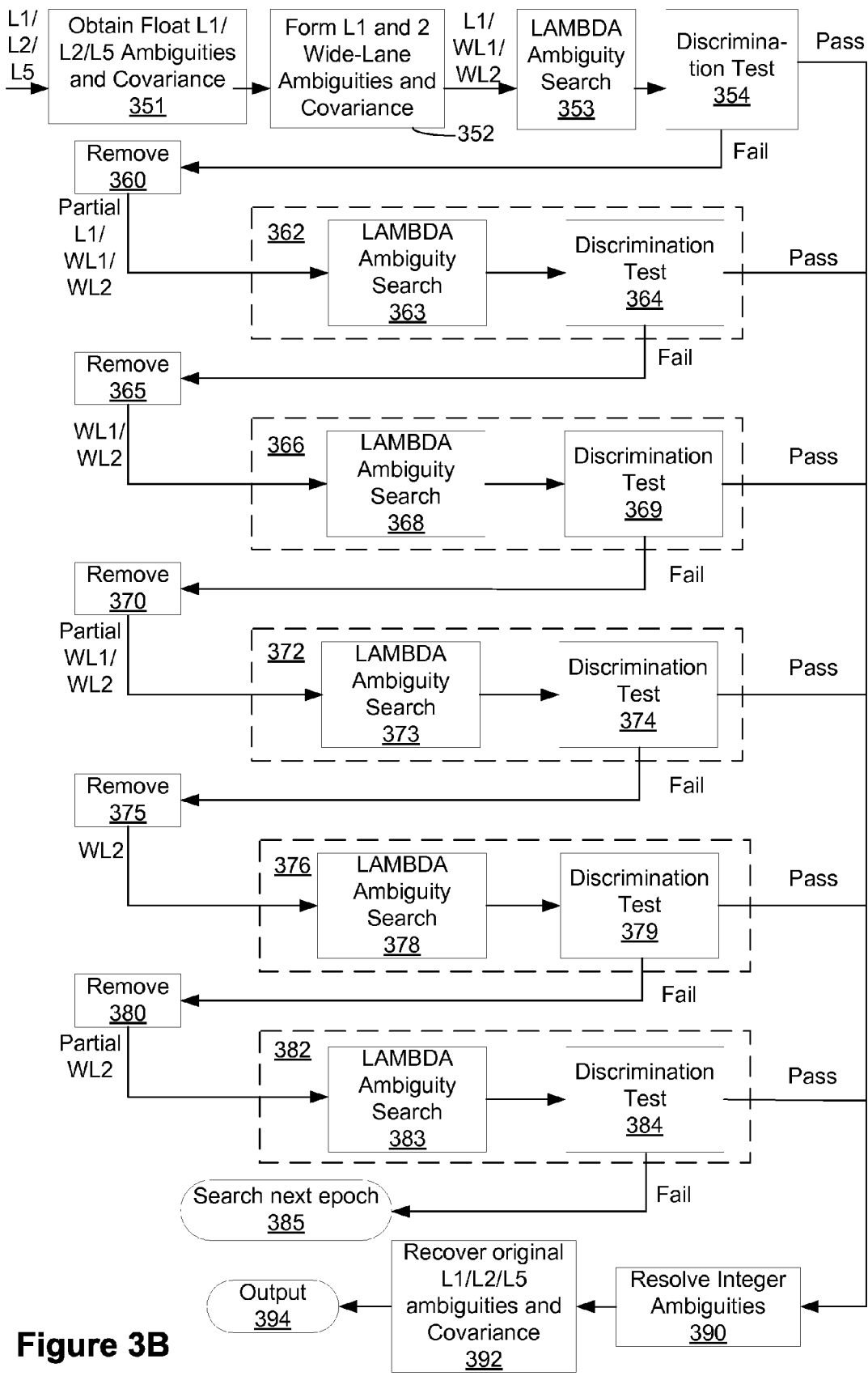
FIG. 3B is a flow diagram illustrating a partial search process for a three frequency global navigation satellite system in accordance with some embodiments.

FIG. 3B illustrates the partial search computational flow for a three frequency system. After the double-difference measurements from both frequencies are processed 240 (FIG. 2), the floating ambiguity vector and the associated variance can be obtained 351 from Equations (5) and (8) from the Kalman filter estimation 250 (FIG. 2). In one embodiment, the original ambiguity states for the L1, L2 and L5 frequencies are transformed 352 into a set of alternate ambiguity combinations, $\hat{N}_{(1,0,0)}$, $\hat{N}_{(1,-1,0)}$, and $\hat{N}_{(0,1,-1)}$:

$$\hat{N}_{(1,0,0),(1,-1,0),(0,1,-1)} = \begin{pmatrix} \hat{N}_{(1,0,0)} \\ \hat{N}_{(1,-1,0)} \\ \hat{N}_{(0,1,-1)} \end{pmatrix} = \begin{pmatrix} 1 & 0 & 0 \\ 1 & -1 & 0 \\ 0 & 1 & -1 \end{pmatrix} \quad (25)$$

$$Q_{\hat{N}_{(1,0,0),(1,-1,0),(0,1,-1)}} = \begin{pmatrix} 1 & 0 & 0 \\ 1 & -1 & 0 \\ 0 & 1 & -1 \end{pmatrix} \begin{pmatrix} Q_{N_1,N_1} & Q_{N_1,N_2} & Q_{N_1,N_3} \\ Q_{N_2,N_1} & Q_{N_2,N_2} & Q_{N_2,N_3} \\ Q_{N_3,N_1} & Q_{N_3,N_2} & Q_{N_3,N_3} \end{pmatrix} \begin{pmatrix} 1 & 1 & 0 \\ 0 & -1 & 1 \\ 0 & 0 & -1 \end{pmatrix} \quad (26)$$

The new ambiguities which result are the original L1 ambiguity and two wide-lane ambiguities, $\hat{N}_{(1,-1,0)}$, and $N_{(0,1,-1)}$, one between the L1 and L2 frequencies and the other between the L2 and L5 frequencies. In other embodiments, other combinations of the ambiguity states for the L1, L2 and L5 frequencies can be used.

The best candidate set and second best candidate set for $\hat{N}_{(1,0,0)}$, $\hat{N}_{(1,-1,0)}$, and $\hat{N}_{(0,1,-1)}$ can be found with the LAMBDA search process 353, as described above. A discrimination test 354, is applied to best and second best integer ambiguity candidate tests. As described above, the discrimination test 354 includes a ratio test of the best candidate set and the second best candidate set. If the discrimination test 354 is passed, the best candidate set is accepted as the correct ambiguity set to resolve the integer ambiguities 390 and produce the fixed solution 394 from Equations (14) and (15).

The partial search procedure is applied when the best candidate set and second best candidate set of $\hat{N}_{(1,0,0)}$, $\hat{N}_{(1,-1,0)}$, and $\hat{N}_{(0,1,-1)}$ fail to pass the discrimination test 354. In one embodiment, the partial search technique is to exclude from the set of ambiguities to be searched those ambiguity values whose integer ambiguity values in the best candidate set and second best candidate set are different. In another embodiment, the partial search technique is to exclude those satellites whose integer ambiguities of the best candidate set and second best candidate set are not identical. In yet another embodiment, the one or more $\hat{N}_{(1,0,0)}$ ambiguities whose integer ambiguities of the best candidate set and second best candidate set are different are removed from the set of ambiguities to be searched 360, while all of the wide-lane $\hat{N}_{(1,-,0)}$ and $\hat{N}_{(0,1,-1)}$ ambiguities remain. For purposes of this explanation of the partial search procedure, we will assume that the last mentioned methodology is used.

Once the set of ambiguities to be searched has been reduced by removal operation 360, a new search 362 is performed, including a LAMBDA search process 363 for best and second best candidate sets for the reduced set of ambiguities produced by operation 360, and a discrimination test 364 performed on the resulting best and second best integer ambiguity candidate sets. If the discrimination test 364 is passed by the new best candidate set, the procedure moves to operation 390, as described above.

Otherwise, if the discrimination test 364 fails, the procedure moves to remove operation 365 in which all of the $\hat{N}_{(1,0,0)}$ ambiguities are removed from the set of ambiguity values to be searched, while all of the wide-lane $\hat{N}_{(1,-1,0)}$ and $\hat{N}_{(0,1,-1)}$ ambiguities are retained in the set of ambiguity values to be searched. Once the set of ambiguities to be searched has been reduced by removal operation 365, a new search 366 is performed, including a LAMBDA search process 368 for best and second best candidate sets for the reduced set of ambiguities produced by operation 365, and a discrimination test 369 performed on the resulting best and second best integer ambiguity candidate sets. If the discrimination test 369 is passed by the new best candidate set, the procedure moves to operation 390, as described above.

Otherwise, if the discrimination test 369 fails, the procedure moves to remove operation 370 in which the one or more wide-lane $\hat{N}_{(1,-1,0)}$ ambiguities whose values in the best candidate set and second best candidate set are not equal are removed from the set of ambiguities to be searched, while all of the wide-lane $\hat{N}_{(0,1,-1)}$ ambiguities are retained in the set of ambiguities to be searched. In another embodiment, the roles of the two wide-lane signals may be reversed in remove operation 370, whereby the set of ambiguities $\hat{N}_{(0,1,-1)}$ for the second wide-lane signal which are unequal in the best and second best candidate sets are removed and all the wide-lane ambiguities $\hat{N}_{(1,-1,0)}$ for the first wide-lane signal are retained. Once the set of ambiguities to be searched has been reduced by removal operation 370, a new search 372 is performed, including a LAMBDA search process 373 for best and second best candidate sets for the reduced set of ambiguity values produced by operation 370, and a discrimination test 374 performed on the resulting best and second best integer ambiguity candidate sets. If the discrimination test 374 is passed by the new best candidate set, the procedure moves to operation 390, as described above.

Otherwise, if the discrimination test 374 fails, the procedure moves to remove operation 375 in which all of the $\hat{N}_{(1,-1,0)}$ ambiguities for the first wide-lane signal are removed from the set of ambiguities to be searched, while all of the $\hat{N}_{(0,1,-1)}$ ambiguities for the second wide-lane signal are retained in the set of ambiguities to be searched. Once the set of ambiguities to be searched has been reduced by removal operation 375, a new search 376 is performed, including a LAMBDA search process 378 for best and second best candidate sets for the reduced set of ambiguities produced by operation 375, and a discrimination test 379 performed on the resulting best and second best integer ambiguity candidate sets. If the discrimination test 379 is passed by the new best candidate set, the procedure moves to operation 390, as described above.

Otherwise, if the discrimination test 379 fails, the procedure moves to remove operation 380 in which the one or more $\hat{N}_{(0,1,-1)}$ ambiguities whose values in the best candidate set and second best candidate set are not equal are removed from the set of ambiguities to be searched. Once the set of ambiguities to be searched has been reduced by removal operation 380, a new search 382 is performed, including a LAMBDA search process 383 for best and second best candidate sets for the reduced set of ambiguities produced by remove operation 380, and a discrimination test 384 performed on the resulting best and second best integer ambiguity candidate sets. If the discrimination test 384 is passed by the new best candidate set, the procedure moves to operation 390, as described above.

If the discrimination test 384 is failed by the new best candidate set, the search process fails for the current epoch and is the process begins anew at the next epoch 334, using new measurement values for the satellite signals.

In one embodiment, during each epoch the partial search process is repeatedly applied, as described above with reference to FIG. 3B, until either (A) any of the remove processes 360, 365, 370, 375 or 380 results in the search set having ambiguity values for fewer than five satellites, (B) failure of all the searches, or (C) the search is successful, as indicate by one of the best integer ambiguity candidate sets passing the corresponding discrimination test 364, 369, 374, 379, or 384. If a discrimination test is passed, the best candidate set will be accepted as the correct ambiguity set to resolve the integer ambiguities 390 and produce the fixed solution 394 from Equations (14) and (15).

In one embodiment, after all or partial sets of $N_{(1,0,0)}$, $N_{(1,-1,0)}$ and, $N_{(0,1,-1)}$ are fixed, the original L1, L2 and L5 ambiguities and associated variance can be recovered as follows:

$$\begin{pmatrix} \hat{N}_1 \\ \hat{N}_2 \\ \hat{N}_5 \end{pmatrix} = \begin{pmatrix} 1 & 0 & 0 \\ 1 & -1 & 0 \\ 1 & -1 & -1 \end{pmatrix} \begin{pmatrix} \hat{N}_{(1,0,0)} \\ \hat{N}_{(1,-1,0)} \\ \hat{N}_{(0,1,-1)} \end{pmatrix} \quad (27)$$

$$Q_{\hat{N}_{1,2,5}} = \begin{pmatrix} 1 & 0 & 0 \\ 1 & -1 & 0 \\ 1 & -1 & -1 \end{pmatrix} \quad (28)$$

$$\begin{pmatrix} Q_{N_{(1,0,0)},N_{(1,0,0)}} & Q_{N_{(1,0,0)},N_{(1,-1,0)}} & Q_{N_{(1,0,0)},N_{(0,1,-1)}} \\ Q_{N_{(1,-1,0)},N_{(1,0,0)}} & Q_{N_{(1,-1,0)},N_{(1,-1,0)}} & Q_{N_{(1,-1,0)},N_{(0,1,-1)}} \\ Q_{N_{(0,1,-1)},N_{(1,0,0)}} & Q_{N_{(0,1,-1)},N_{(1,-1,0)}} & Q_{N_{(0,1,-1)},N_{(0,1,-1)}} \end{pmatrix}$$

$$\begin{pmatrix} 1 & 1 & 1 \\ 0 & -1 & -1 \\ 0 & 0 & -1 \end{pmatrix}$$

In one embodiment, if the search for a set of integer ambiguity values that passes the discrimination test fails, the ambiguity resolution procedure in the present epoch has failed and the process of searching for a consistent set of ambiguity values that pass the discrimination test resumes in the next epoch 385, using new measurements of the satellite signals.

Figure 4A:
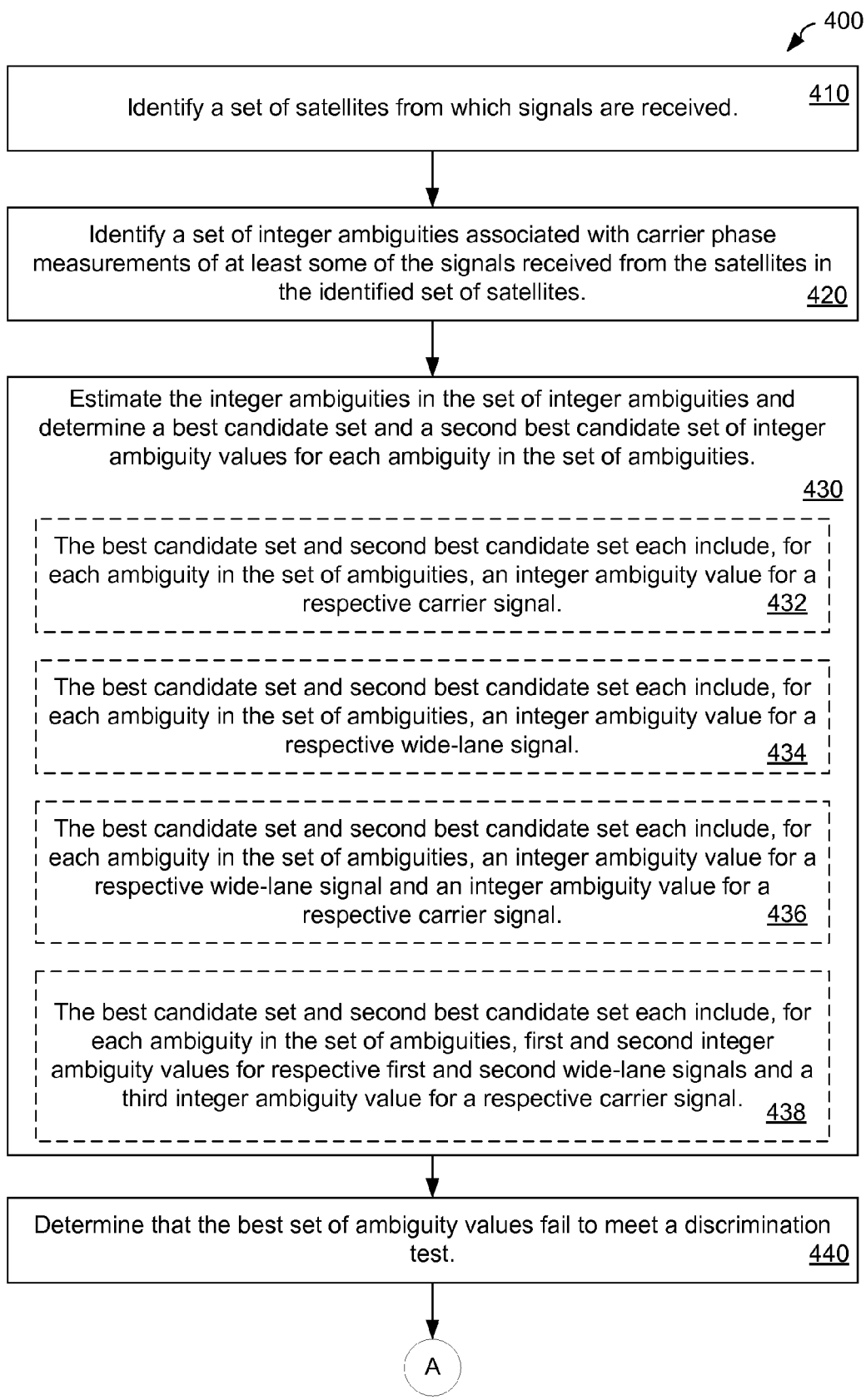
FIGS. 4A-4C are flow diagrams illustrating a method for performing partial search integer ambiguity resolution in accordance with some embodiments.
Figure 4B:
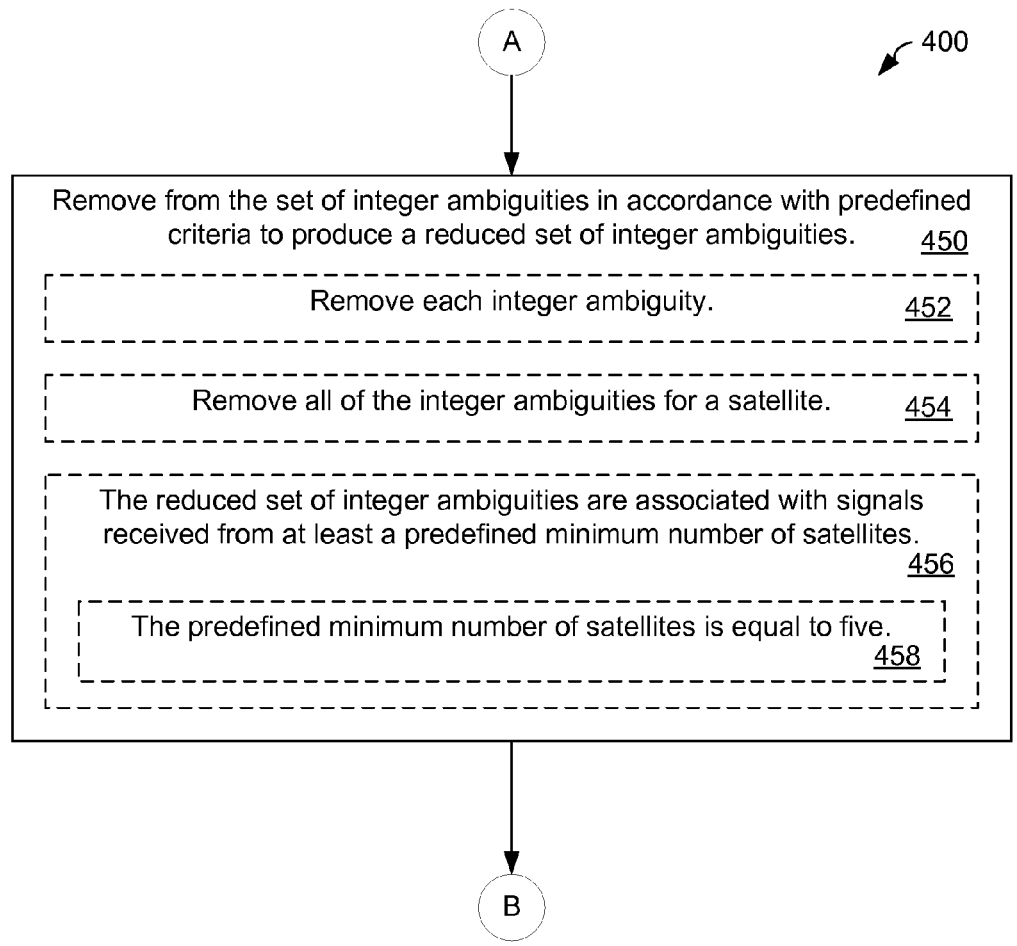
Figure 4C:
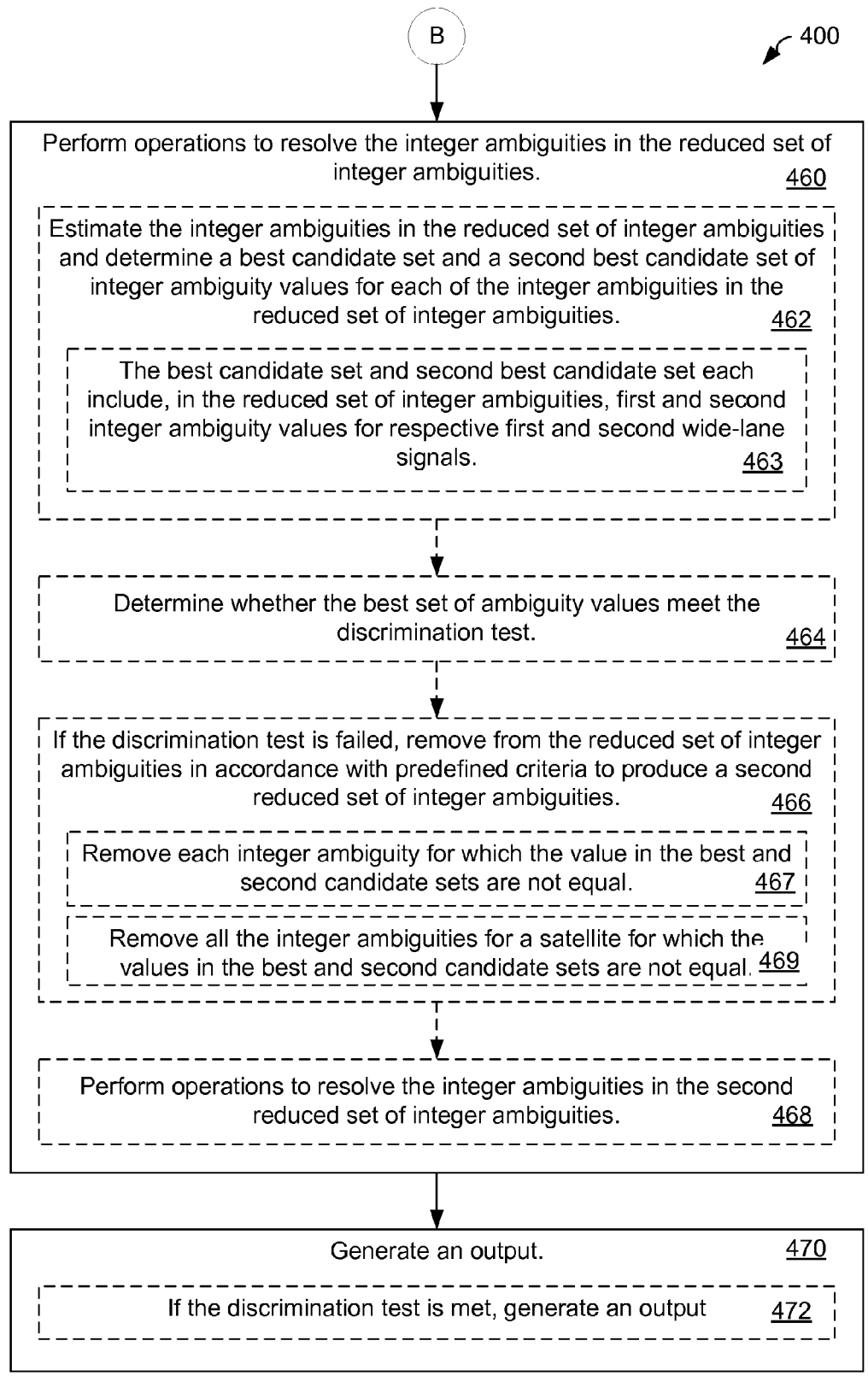

FIGS. 4A-C illustrate a method 400 for performing partial search integer ambiguity resolution. As shown in FIG. 4A, the method 400 includes identifying a set of satellites from which signals are received 410. The set of satellites typically includes only those satellites for which carrier phase measurements are successfully made. A set of floating ambiguities associated with the carrier phase measurements of at least some of the signals is identified 420.

Integer ambiguities for the set of floating ambiguities are estimated and a best candidate set and a second best candidate set of integer ambiguity values for the ambiguities in the set of ambiguities are determined 430. If all the satellites for which carrier signal measurements were made are represented in the set of ambiguities, then at least one best candidate and one second best candidate integer ambiguity value will be produced for each satellite in the set of satellites. In one embodiment, the best candidate set and second best candidate set each include an integer ambiguity value for a respective carrier signal 432. In another embodiment, the best candidate set and second best candidate set each include an integer ambiguity value for a respective wide-lane signal 434. In one embodiment, the best candidate set and second best candidate set each include an integer ambiguity value for a respective wide-lane signal and an integer ambiguity value for a respective carrier signal 436. In yet another embodiment, the best candidate set and second best candidate set each include an integer ambiguity value for respective first and second wide-lane signals and an integer ambiguity value for a respective carrier signal 438.

Referring to both FIGS. 4A and 4B, once it is determined that the best set of integer ambiguity values fail to meet the discrimination test 440, a reduced set of ambiguities is produced by removing from the set of floating ambiguities in accordance with predefined criteria 450. In one embodiment, the predefined criteria may be to remove each ambiguity whose integer ambiguities of the best candidate set and second best candidate set are different 452. In another embodiment, all the ambiguities for a satellite are removed 454 if any of the integer ambiguities in the best candidate set and second best candidate set for that satellite are not identical. In some embodiments, the reduced set of ambiguities are associated with signals from at least a predefined minimum number of satellites 456. For example, in some embodiments the predefined minimum number of satellites is equal to five 458. Referring to FIG. 4C, method 400 continues with a set of operations 460 to resolve the integer ambiguities in the reduced set of ambiguities.

In one embodiment, the operations 460 include two or more the operations 462-469 described next. In operation 462, integer ambiguities in the reduced set of floating ambiguities are estimated and a best candidate set and a second best candidate set of integer ambiguity values for each of the ambiguities in the reduced set of floating ambiguities is determined. In one embodiment, the best candidate set and second best candidate set each include first and second integer ambiguity values for respective first and second wide-lane signals 463. In operation 464, it is determined if the best set of ambiguities meet the discrimination test. If the discrimination test is failed, a second reduced set of ambiguities are produced 466 by removing from the reduced set of ambiguities in accordance with predefined criteria. In one embodiment, the predefined criteria is to remove each ambiguity whose integer ambiguities of the best candidate set and second best candidate set are different 467. In another embodiment, the remove operation 466 includes removing all the ambiguities for a satellite whose integer ambiguities of the best candidate set and second best candidate set are different 469. In operation 468, operations are performed to resolve the integer ambiguities in the second reduced set of ambiguities.

An output is generated 470. In one embodiment, this includes generating an output (e.g., a set of integer ambiguity values to be used for navigation) if the discrimination test is met 472.

Figure 5:
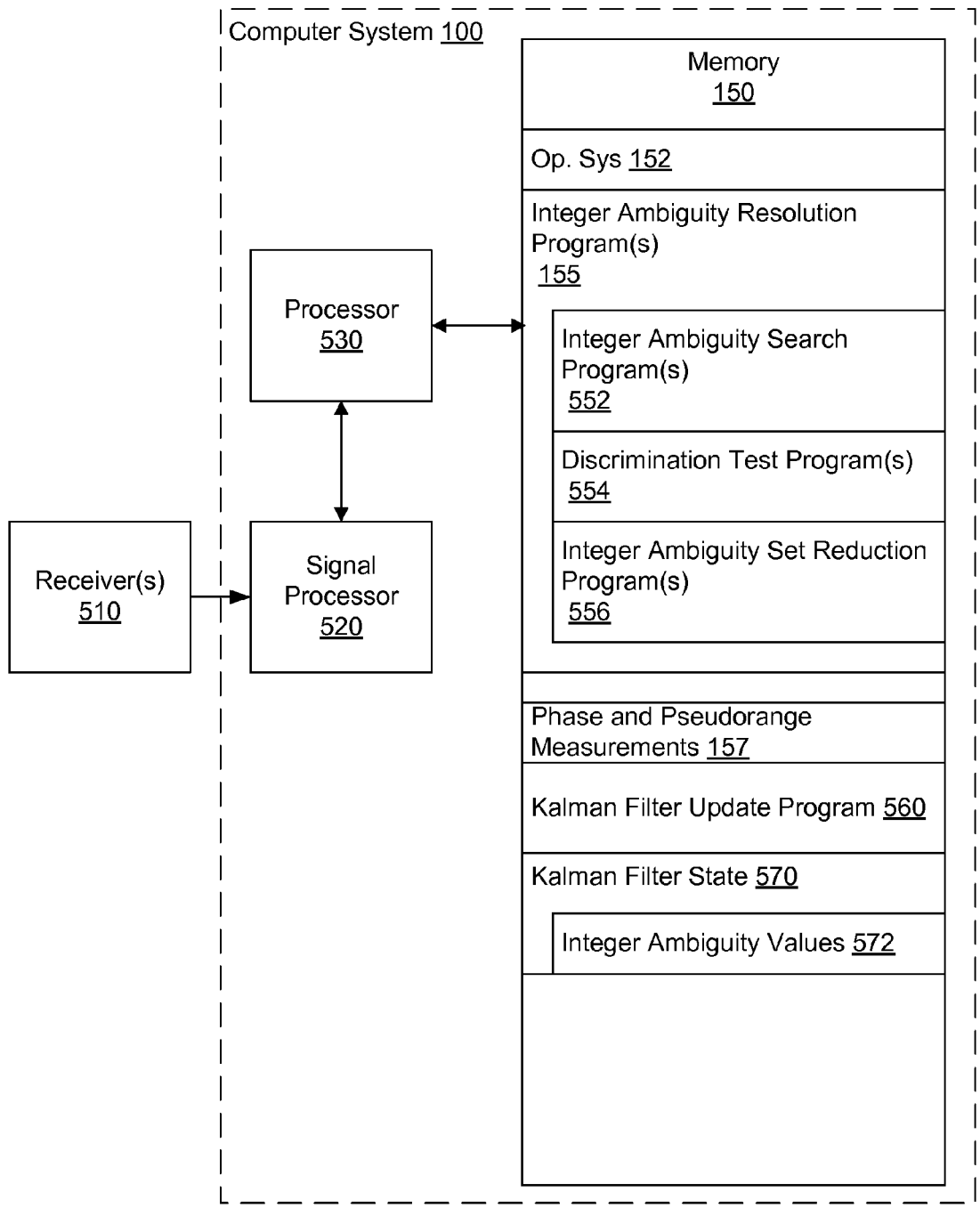
FIG. 5 is a block diagram illustrating components in a global navigation satellite system in accordance with some embodiments.

FIG. 5 illustrates an embodiment of the computer system 100. The computer system 100 includes a signal processor 520, at least one processor 530 and memory 150. Memory 150, which may include high-speed random access memory and may also include non-volatile memory, such as one or more magnetic disk storage devices, EEPROM and/or Flash EEPROM, includes an operating system 152, carrier phase and pseudorange measurements 157, a Kalman filter update program 560, a Kalman filter state 570 (including ambiguity values 572, and at least one integer ambiguity resolution program module 155, executed by processor 530. The integer ambiguity resolution program module 155 includes at least one integer ambiguity search program 552, at least one discrimination test program 554, and at least one ambiguity set reduction program 556. In some embodiments there may be more than one processor 530. In other embodiments, the computer system 200 may include an application specific integrated circuit (ASIC) that performs some or all of the functionality of the integer ambiguity resolution program module 155.

In some embodiments, the computer system 100 is coupled to one or more receivers 510, such as the user GPS receiver 120 (FIG. 1). The one or more receivers 510 may also include a receiver that receives correction data from one or more reference receivers from a wide area augmentation system (WAAS), such as Navcom Technology Inc.'s StarFire™ Network. In other embodiments, the computer system 100 and the receiver 510 are integrated into a single device. Furthermore, in some embodiments, the signal processor 520 is integrated with the GPS 120, which may or may not be part of the computer system 100.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for performing integer ambiguity resolution in a global navigation satellite system, comprising:
    identifying a set of satellites from which carrier signals are received;
    identifying a set of ambiguities associated with carrier phase measurements of at least some of the signals received from the satellites in the identified set of satellites;
    estimating integer ambiguities in the set of ambiguities, including determining a best candidate set and a second best candidate set of integer ambiguity values for each of the ambiguities in the set of ambiguities;
    upon determining that the best candidate set of integer ambiguity values fails to meet a discrimination test with respect to the second best candidate set, removing from the set of ambiguities each ambiguity for which integer ambiguity values in the best candidate set and second best candidate set fail to meet predefined criteria to produce a reduced set of ambiguities;
    performing operations to resolve the ambiguities in the reduced set of ambiguities; and
    generating an output in accordance with a result of the operations performed to resolve the ambiguities in the reduced set of ambiguities.

2. The method of claim 1, wherein the predefined criteria comprise a requirement that, for a respective ambiguity, the integer ambiguity values in the best candidate set and second best candidate set are equal.

3. The method of claim 1, wherein the ambiguities of the reduced set of ambiguities are associated with carrier phase measurements of carrier signals received from at least a predefined minimum number of satellites required for instantaneous ambiguity resolution.

4. The method of claim 3, wherein the predefined minimum number of satellites is equal to five.

5. The method of claim 1, wherein the best candidate set and second best candidate set each include, for each ambiguity in the set of ambiguities, an integer ambiguity value for a respective carrier signal.

6. The method of claim 1, wherein:
    identifying the set of ambiguities comprises identifying respective wide-lane ambiguities corresponding to respective satellites in the identified set of satellites; and
    the best candidate set and second best candidate set each include integer ambiguity values for the respective wide-lane ambiguities.

7. The method of claim 1, wherein:
    identifying the set of ambiguities comprises identifying respective wide-lane ambiguities corresponding to respective satellites in the identified set of satellites and respective carrier-signal ambiguities corresponding to respective carrier signals; and
    the best candidate set and second best candidate set each include, for each satellite in the identified set of satellites, an integer ambiguity value for a respective wide-lane ambiguity and an integer ambiguity value for a respective carrier-signal ambiguity.

8. The method of claim 1, wherein:
    identifying the set of ambiguities comprises, for respective satellites in the identified set of satellites, identifying first and second respective wide-lane ambiguities, and further comprises identifying respective carrier-signal ambiguities corresponding to respective carrier signals; and
    the best candidate set and second best candidate set each include, for each satellite in the identified set of satellites, first and second integer ambiguity values for the respective first and second wide-lane ambiguities and an integer ambiguity value for a respective carrier-signal ambiguity.

9. The method of claim 1, wherein the removing includes removing from the set of ambiguities all the ambiguities for a satellite for which the integer ambiguity values in the best candidate set and second best candidate set fail to meet the predefined criteria.

10. The method of claim 1, wherein the global navigation satellite system is selected from the group consisting of a Global Positioning System, (GPS), a Global Orbiting Navigation Satellite System (GLONASS), and a GALILEO positioning system.

11. The method of claim 1, wherein performing operations to resolve ambiguities in the reduced set of ambiguities includes:
    estimating integer ambiguities in the reduced set of ambiguities, including determining a best candidate set and a second best candidate set of integer ambiguity values for each of the integer ambiguities in the reduced set of ambiguities;
    determining whether the best candidate set of integer ambiguity values for the reduced set of ambiguities meets the discrimination test with respect to the second best candidate set of integer ambiguity values for the reduced set of ambiguities, and if the discrimination test is met, generating a set of result values;
    if the best candidate set of integer ambiguity values for the reduced set of ambiguities fails to meet the discrimination test,
        removing from the reduced set of ambiguities each ambiguity for which integer ambiguity values in the best candidate set and second best candidate set of integer ambiguity values for the reduced set of ambiguities fail to meet the predefined criteria to produce a second reduced set of ambiguities;
        performing operations to resolve the integer ambiguities in the second reduced set of ambiguities; and generating the output in accordance with a result of the operations performed to resolve the integer ambiguities in the second reduced set of ambiguities.

12. The method of claim 11, wherein:
identifying the set of ambiguities comprises identifying respective wide-lane ambiguities corresponding to respective satellites in the identified set of satellites; and
the best candidate set and second best candidate set of integer ambiguity values for the reduced set of ambiguities each include first and second integer ambiguity values for respective first and second wide-lane ambiguities.

13. A device to perform ambiguity resolution in a global navigation satellite system, comprising:
a receiver configured to receive satellite carrier signals;
one or more processors; and
memory storing one or more programs configured for execution by the one or more processors, the one or more programs for resolving ambiguities associated with carrier phase measurements of at least some of the carrier signals received from satellites in an identified set of satellites, the one or more programs including:
instructions for identifying a set of ambiguities associated with the carrier phase measurements;
instructions for estimating integer ambiguities in the set of ambiguities, including determining a best candidate set and a second best candidate set of integer ambiguity values for each of the ambiguities in the set of ambiguities;
instructions for determining that the best candidate set of integer ambiguity values fail to meet a discrimination test with respect to the second best candidate set, and upon such determination, removing from the set of ambiguities each ambiguity for which integer ambiguity values in the best candidate set and second best candidate set fail to meet predefined criteria to produce a reduced set of ambiguities;
instructions for performing operations to resolve the integer ambiguities in the reduced set of ambiguities; and
instructions for generating a result in accordance with the resolved integer ambiguities in the reduced set of ambiguities.

14. The device of claim 13, wherein the ambiguities of the reduced set of ambiguities are associated with carrier phase measurements of carrier signals received from at least a predefined minimum number of satellites required for instantaneous ambiguity resolution.

15. The device of claim 14, wherein the predefined minimum number of satellites is equal to five.

16. The device of claim 13, wherein the best candidate set and second best candidate set each include, for each ambiguity in the set of ambiguities, an integer ambiguity value for a respective carrier signal.

17. The device of claim 13, wherein:
the instructions for identifying the set of ambiguities comprise instructions for identifying respective wide-lane ambiguities corresponding to respective satellites in the identified set of satellites; and
the best candidate set and second best candidate set each include, integer ambiguity values for the respective wide-lane ambiguities.

18. The device of claim 13, wherein:
the instructions for identifying the set of ambiguities comprise instructions for identifying respective wide-lane ambiguities corresponding to respective satellites in the identified set of satellites and respective carrier-signal ambiguities corresponding to respective carrier signals; and
the best candidate set and second best candidate set each include, for each satellite in the identified set of satellites, an integer ambiguity value for a respective wide-lane ambiguity and an integer ambiguity value for a respective carrier-signal ambiguity.

19. The device of claim 13, wherein:
the instructions for identifying the set of ambiguities comprise instructions for identifying first and second respective wide-lane ambiguities for respective satellites in the identified set of satellites and instructions for identifying respective carrier-signal ambiguities corresponding to respective carrier signals; and
the best candidate set and second best candidate set each include, for each satellite in the identified set of satellites, first and second integer ambiguity values for the respective first and second wide-lane ambiguities and an integer ambiguity value for a respective carrier-signal ambiguity.

20. The device of claim 13, wherein the instructions for removing include instructions for removing from the set of integer ambiguities all the integer ambiguities for a satellite for which the integer ambiguity values in the best candidate set and second best candidate set fail to meet the predefined criteria.

21. The device of claim 13, wherein the global navigation satellite system is selected from the group consisting of a Global Positioning System, (GPS), a Global Orbiting Navigation Satellite System (GLONASS), and a GALILEO positioning system.

22. The device of claim 13, wherein the instructions for performing operations to resolve ambiguities in the reduced set of ambiguities include:
instructions for estimating integer ambiguities in the reduced set of ambiguities, including determining a best candidate set and a second best candidate set of integer ambiguity values for each of the integer ambiguities in the reduced set of ambiguities;
instructions for determining whether the best candidate set of integer ambiguity values for the reduced set of ambiguities meets the discrimination test with respect to the second best candidate set of integer ambiguity values for the reduced set of ambiguities, and if the discrimination test is met, generating a set of result values; and
instructions, the execution of which are enabled if the best candidate set of integer ambiguity values for the reduced set of ambiguities fails to meet the discrimination test, for:
removing from the reduced set of ambiguities each ambiguity for which integer ambiguity values in the best candidate set and second best candidate set of integer ambiguity values for the reduced set of ambiguities fail to meet the predefined criteria to produce a second reduced set of ambiguities;
performing operations to resolve the integer ambiguities in the second reduced set of ambiguities; and
generating the output in accordance with a result of the operations performed to resolve the integer ambiguities in the second reduced set of ambiguities.

23. The device of claim 22, wherein:
the instructions for identifying the set of ambiguities comprise instructions for identifying respective wide-lane ambiguities corresponding to respective satellites in the identified set of satellites; and
the best candidate set and second best candidate set of integer ambiguity values for the reduced set of ambiguities each include first and second integer ambiguity values for respective first and second wide-lane ambiguities.

24. A positioning or navigation system, comprising:
a receiver configured to receive satellite carrier signals; and
a computer system coupled to the receiver, the computer system including one or more processors and a memory coupled to the processor one or more processors, the memory storing one or more programs for resolving ambiguities associated with carrier phase measurements of at least some of the carrier signals received from satellites in an identified set of satellites, the one or more programs being configured for execution by the one or more processors and including:
instructions for identifying a set of ambiguities associated with the carrier phase measurements;
instructions for estimating integer ambiguities in the set of ambiguities, including determining a best candidate set and a second best candidate set of integer ambiguity values for each of ambiguities in the set of ambiguities;
instructions for determining that the best candidate set of ambiguity values fail to meet a discrimination test with respect to the second best candidate set, and upon such determination, removing from the set of ambiguities each ambiguity for which integer ambiguity values in the best candidate set and second best candidate set fail to meet predefined criteria to produce a reduced set of ambiguities;
instructions for performing operations to resolve the integer ambiguities in the reduced set of ambiguities; and
instructions for generating a result in accordance with the resolved integer ambiguities in the reduced set of ambiguities.

25. The system of claim 24, wherein the ambiguities of the reduced set of ambiguities are associated with carrier phase measurements of carrier signals received from at least a predefined minimum number of satellites required for instantaneous ambiguity resolution.

26. The system of claim 25, wherein the predefined minimum number of satellites is equal to five.

27. The system of claim 24, wherein the best candidate set and second best candidate set each include, for each ambiguity in the set of ambiguities, an integer ambiguity value for a respective carrier signal.

28. The system of claim 24, wherein:
the instructions for identifying the set of ambiguities comprise instructions for identifying respective wide-lane ambiguities corresponding to respective satellites in the identified set of satellites; and
the best candidate set and second best candidate set each include, integer ambiguity values for the respective wide-lane ambiguities.

29. The system of claim 24, wherein:
the instructions for identifying the set of ambiguities comprise instructions for identifying respective wide-lane ambiguities corresponding to respective satellites in the identified set of satellites and respective carrier-signal ambiguities corresponding to respective carrier signals; and
the best candidate set and second best candidate set each include, for each satellite in the identified set of satellites, an integer ambiguity value for a respective wide-lane ambiguity and an integer ambiguity value for a respective carrier-signal ambiguity.

30. The system of claim 24, wherein:
the instructions for identifying the set of ambiguities comprise instructions for identifying first and second respective wide-lane ambiguities for respective satellites in the identified set of satellites and instructions for identifying respective carrier-signal ambiguities corresponding to respective carrier signals; and
the best candidate set and second best candidate set each include, for each satellite in the identified set of satellites, first and second integer ambiguity values for the respective first and second wide-lane ambiguities and an integer ambiguity value for a respective carrier-signal ambiguity.

31. The system of claim 24, wherein the instructions for removing include instructions for removing from the set of ambiguities all the ambiguities for a satellite for which the integer ambiguity values in the best candidate set and second best candidate set fail to meet the predefined criteria.

32. The system of claim 24, wherein the global navigation satellite system is selected from the group consisting of a Global Positioning System, (GPS), a Global Orbiting Navigation Satellite System (GLONASS), and a GALILEO positioning system.

33. The system of claim 24, wherein the instructions for performing operations to resolve ambiguities in the reduced set of ambiguities include:
instructions for estimating integer ambiguities in the reduced set of ambiguities, including determining a best candidate set and a second best candidate set of integer ambiguity values for each of the ambiguities in the reduced set of ambiguities;
instructions for determining whether the best candidate set of ambiguity values for the reduced set of integer ambiguities meets the discrimination test with respect to the second best candidate set of integer ambiguity values for the reduced set of ambiguities, and if the discrimination test is met, generating a set of result values; and
instructions, the execution of which are enabled if the best candidate set of integer ambiguity values for the reduced set of ambiguities fails to meet the discrimination test, for:
removing from the reduced set of ambiguities each ambiguity for which integer ambiguity values in the best candidate set and second best candidate set of integer ambiguity values for the reduced set of ambiguities fail to meet the predefined criteria to produce a second reduced set of ambiguities;
performing operations to resolve the integer ambiguities in the second reduced set of ambiguities; and
generating the output in accordance with a result of the operations performed to resolve the integer ambiguities in the second reduced set of ambiguities.

34. The system of claim 33, wherein:
the instructions for identifying the set of ambiguities comprise instructions for identifying respective wide-lane ambiguities corresponding to respective satellites in the identified set of satellites; and
the best candidate set and second best candidate set of integer ambiguity values for the reduced set of ambiguities each include first and second integer ambiguity values for respective first and second wide-lane ambiguities.

35. The device of claim 13, wherein the predefined criteria comprise a requirement that, for a respective ambiguity, the integer ambiguity values in the best candidate set and second best candidate set are equal.

36. The system of claim 24, wherein the predefined criteria comprise a requirement that, for a respective ambiguity, the integer ambiguity values in the best candidate set and second best candidate set are equal.

* * * * *